United States Patent
Weinlaender

(10) Patent No.: US 9,754,140 B2
(45) Date of Patent: Sep. 5, 2017

(54) METHOD AND READ/WRITE DEVICE FOR SELECTING A WIRELESS DATA MEDIUM

(71) Applicant: Siemens Aktiengesellschaft, Munich (DE)

(72) Inventor: Markus Weinlaender, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/830,360

(22) Filed: Aug. 19, 2015

(65) Prior Publication Data

US 2016/0063289 A1 Mar. 3, 2016

(30) Foreign Application Priority Data

Aug. 27, 2014 (EP) ..................................... 14182499

(51) Int. Cl.
*G06K 7/00* (2006.01)
*G06K 7/10* (2006.01)
*H04B 7/155* (2006.01)
*H04B 10/532* (2013.01)
(Continued)

(52) U.S. Cl.
CPC ..... *G06K 7/10316* (2013.01); *G06K 7/10356* (2013.01); *H04B 5/0056* (2013.01); *H04B 7/1555* (2013.01); *H04B 10/532* (2013.01); *G06K 19/07773* (2013.01)

(58) Field of Classification Search
CPC ............. H01Q 21/245; G06K 7/10415; G06K 7/10316; G06K 7/10356; G06K 19/07773; H04B 7/1555; H04B 10/532
See application file for complete search history.

(56) References Cited

U.S. PATENT DOCUMENTS

2002/0063622 A1* 5/2002 Armstrong ........... G06K 7/0008
340/10.31
2005/0200528 A1* 9/2005 Carrender ................ H01Q 1/22
343/700 MS
(Continued)

FOREIGN PATENT DOCUMENTS

WO    WO 2011/135329    11/2011

OTHER PUBLICATIONS

"Intelligente Kathrein RFID Reader für die vierte industrielle Revolution", ident Das führende Anwendermagazin pür Automatische Datenerfassung & Identifikation, 201, 3 pages.

*Primary Examiner* — Thomas Alunkal
(74) *Attorney, Agent, or Firm* — Cozen O'Connor

(57) ABSTRACT

A method and a read/write device for selecting at least one wireless data medium from a number of detected wireless data media that are RFID transponders, wherein the data media are registered in a detection area of a read/write device via a plurality of detection cycles, at least one receive parameter is recorded for each of the detected data media, and at least one data medium of the data media is selected based on an evaluation of the recorded receive parameters, a plurality of detection cycles are performed at different antenna polarizations, at least one receive parameter is recorded at each of utilized antenna polarizations for the detected data media, and at least one of the detected data media is selected in each case based on a statistical evaluation of the receive parameters recorded in the different antenna polarizations.

14 Claims, 2 Drawing Sheets

(51) Int. Cl.
*H04B 5/00* (2006.01)
*G06K 19/077* (2006.01)

(56) References Cited

U.S. PATENT DOCUMENTS

| | | | | |
|---|---|---|---|---|
| 2006/0176152 A1* | 8/2006 | Wagner | ............... | G06K 7/0008 340/10.2 |
| 2007/0052524 A1* | 3/2007 | Tanaka | ............... | G06K 7/0008 340/10.2 |
| 2007/0194929 A1* | 8/2007 | Wagner | ............. | G06K 7/10346 340/572.7 |
| 2008/0150691 A1* | 6/2008 | Knadle | ............... | G06K 7/0008 340/10.1 |
| 2008/0238686 A1* | 10/2008 | Tuttle | ................. | G06K 7/0008 340/572.7 |
| 2009/0303004 A1* | 12/2009 | Tuttle | .................... | G01S 11/10 340/10.1 |
| 2011/0032079 A1* | 2/2011 | Bloy | ...................... | H01P 5/02 340/10.1 |
| 2013/0201003 A1* | 8/2013 | Sabesan | ................... | G01S 7/42 340/10.1 |

* cited by examiner

| Data medium | Polarization | Field strength [%] |
|---|---|---|
| ID1 | H | 26 |
| ID1 | V | 92* |
| ID1 | CR | 31 |
| ID1 | CL | 29 |
| ID2 | H | 90* |
| ID2 | V | 85* |
| ID2 | CR | 87* |
| ID2 | CL | 82* |
| ID3 | H | 94* |
| ID3 | V | 29 |
| ID3 | CR | 45 |
| ID3 | CL | 85* |

METHOD AND READ/WRITE DEVICE FOR SELECTING A WIRELESS DATA MEDIUM

BACKGROUND OF THE INVENTION

1. Field of the Invention

The invention relates to a method for selecting at least wireless data medium one from a number of detected wireless data media, and a read/write device for selecting the wireless data medium.

2. Description of the Related Art

Contactlessly readable Radio Frequency Identification (RFID) technology data media, also referred to as transponders or "tags", are frequently used for the contactless identification of goods and items of all types. Due to the higher range, Ultra High Frequency (UHF) RFID systems are increasingly used instead of High Frequency (HF) RFID transponders in industrial applications, particularly in automated production plants. The disadvantage of the higher range is that a plurality of transponders are often simultaneously received in an unwanted manner, for example, also as a result of "overshoots", which may, inter alia, be the result of reflections of the electromagnetic waves on metal surfaces. For such cases, known RFID read/write devices (often also referred to as "readers") are provided with filter devices that are intended to ensure that only a single, specific transponder is relayed to an application, such as a control device for an automation task. Filters of this type regularly attempt to choose or select the transponder closest to the application and therefore to the read/write device from the set of received or detected transponders using receive parameters, such as via a radio signal strength.

Possible measures for increasing the reading reliability and for selecting the closest transponder in the prior art are, such as a dynamic adaptation of the transmission power, a threshold value for the expected minimum signal strength ("RSSI") of a transponder response, or statistical evaluations via a reading frequency in the case of a repeated detection. These measures are implemented as filter criteria and filter algorithms in conventional RFID read/write devices to select the "correct" transponder, i.e., the transponder relevant to the respective application, from a broadly detected "transponder population", which, as mentioned, should mainly involve the closest of the transponders.

The read/write devices, in particular those for the UHF RFID frequency range, are frequently used in substantially "metal" environments. For example, in industrial plants and areas with machinery and the like that have substantial areas consisting of electrically conducting material (e.g., sheet-metal cladding), overshoots often occur due to the resulting reflections of the radio signal from and to the wireless data media (transponders). This means that, in unfavorable cases, more distant data media are also detected that have a similar or sometimes even a better/higher field strength than the closer of the data media, which in most cases are preferably to be detected. Moreover, these reflections or the resulting overshoots are often dynamic, i.e., the reflection behavior in the arrangement and therefore also the overshoots can change uncontrollably due to changes in the environment, in the alignment of transponder antennas in relation to reader antennas (the "configuration") or in other circumstances that cannot be influenced, This can already happen, for example, because an object to be identified is moved with the data medium to be identified, which is almost always the case in conventional production processes. For these reasons, the described methods for selecting the intended (usually the spatially closest) data medium which are mostly based on an evaluation of the received field strength or, in a related manner, on a variation in the employed transmission power of the read/write device, in arrangements with reflection-induced overshoots, are often not sufficiently reliable.

In short, a plurality of conventional methods exist for selecting a required or closest transponder, for example, the use of different antenna types which must, however, already be suitably selected by the user during the installation of the system, or the use of statistical evaluation algorithms, or alternatively by a "power-ramping" method, or even a combination of the described methods. The results achievable therewith still offer room for improvement, particularly in the industrial environment.

From the technical journal "ident" No. 4/2013, pp. 14 and 15, an antenna suitable for RFID use is known that can alternately use different polarizations, in particular a horizontal or vertical polarization or a right-rotating and left-rotating circular polarization. It is known from the prior art, for a detection that is as complete as possible of a number (population) of data media, to perform a plurality of detection cycles successively, in each case with a different antenna polarization, with which even data media that are unfavorably aligned in relation to the antenna or are further away can be reliably detected.

In arrangements in which the data media (RFID transponders) always have a defined alignment in relation to the antenna of the read/write device, a multipolarization antenna of this type can be permanently set to the mode that corresponds to the similarly permanent alignment of the data media (static configuration), whereby the selection of the data media based on the received field strength measurement and therefore the selection of the data media with the best received field strength in some cases shows good results, but, in arrangements with randomly aligned data media, the setting of an antenna of this type to the defined polarization type results in less satisfactory results in the selection of data media.

SUMMARY OF THE INVENTION

It is therefore an object of the present invention to improve the selection of data media (RFID transponders), particularly in environments with reflection-induced overshoots of more distant data media.

This and other objects and advantages are achieved in accordance with the invention based on the new realization that the signals of the data media that are reflected on metal or conductive surfaces and are primarily responsible for the overshoots in the industrial environment, have, in the case of multiple detection ("inventory") with different antenna polarizations, a higher variance in the received field strength or required transmitted field strength than the data media received or detected directly. In accordance with the invention, the data media, i.e., the "population", are therefore detected multiple times, in each case with a different antenna polarization, where the data medium or data media selected as closest is/are the data medium/media that is/are actually receivable with a multiplicity or all antenna polarizations that are used, or that is/are consistently receivable with a high quality, whereas others of the data media that can be detected with only one or a small number of antenna polarizations or are receivable with only one or with fewer antenna polarizations with a comparatively good received field strength value (or at least considerably poorer than the first-mentioned group), with a high probability have not or have hardly been received directly, but instead have been received due to a reflection-induced overshoot and are therefore not to be selected in normal applications. A statistical statement indicating whether the respective data medium has been received primarily directly or "indirectly" can therefore be made in accordance with the invention by a statistical evaluation via receive parameters, in particular received field strength or "detectability", over a plurality of detection cycles in each case with a different antenna polarization, and a selection of the (or a number of) presumably closest data medium/media can be performed.

The object is achieved in particular by a method and a read/write device, where to achieve the object of the invention, a method is provided for selecting at least one wireless data medium from a number of detected wireless data media, in particular at least one from a number of RFID transponders, where the data media are registered in a detection area of a read/write device via a number of detection cycles, where at least one receive parameter is recorded for each of the detected data media, and where at least one of the data media is selected based on an evaluation of the recorded receive parameters. A plurality of detection cycles are performed by the read/write device in each case with a different antenna polarization, where at least one receive parameter is recorded in each case in the detection with the respectively used antenna polarization for the detected data media, and where at least one of the detected data media is selected in each case based on a statistical evaluation of the receive parameters recorded in the different antenna polarizations. With the inventive method, it is possible to select the closest of the data media that are therefore also detected without a reflection, because these data media are well detected with virtually every antenna configuration (polarization).

The object of the invention is furthermore achieved by providing a read/write device for selecting at least one from a number of data media, in particular RFID transponders, located within a detection area of the read/write device, with an antenna that is built-in or connected to the read/write device, where the antenna is configured for alternate operation with different antenna polarizations. The read/write device has an evaluation unit to select at least one of the detected data media via one of the above-described methods. The advantages discussed with reference to the inventive method can be achieved with a read/write device of this type.

The data medium or data media with the highest number of different antenna polarizations is advantageously selected. This results in a simple evaluation, because no threshold values (for example, for a Received Signal Strength Indicator (RSSI) value) need to be defined, but rather the distinction between "readable" and "non-readable" suffices.

In a further embodiment, a plurality of detection cycles are performed with each antenna polarization that is used, in each case with a different transmission power of the read/write device, in particular with a transmission power increasing constantly from cycle to cycle ("power-ramping"), where the transmission power that was required at least for the successful detection of the respective data medium with the respectively used antenna polarization is detected as the receive parameter for each detected data medium and for each antenna polarization. Unlike the previously discussed embodiment, a limit value of the received signal strength related to the function is therefore not used here as the "receive parameter", but rather a transmission power that is assigned to the respective detection process is used here as the receive parameter.

Insofar as a plurality of different radio channels (transmission frequencies) or frequency bands are available for selection, the method is advantageously performed repeatedly using different radio channels, where the detectability of the data media with the highest possible number of different radio channels and/or the transmission power required at least for a successful detection in the case of the respective radio channel and the antenna polarization used therein is used as an alternative or additional criterion for the selection or non-selection of the respective data medium. In addition to the variation of the polarization planes, a variation is therefore implemented via the transmission frequency also, thereby enabling an even better differentiation of the "spatial proximity" of the data media.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method and read/write device in accordance with the invention is explained below with reference to the figures, in which.

DETAILED DESCRIPTION OF THE EXEMPLARY EMBODIMENTS

Figures 1, 2:
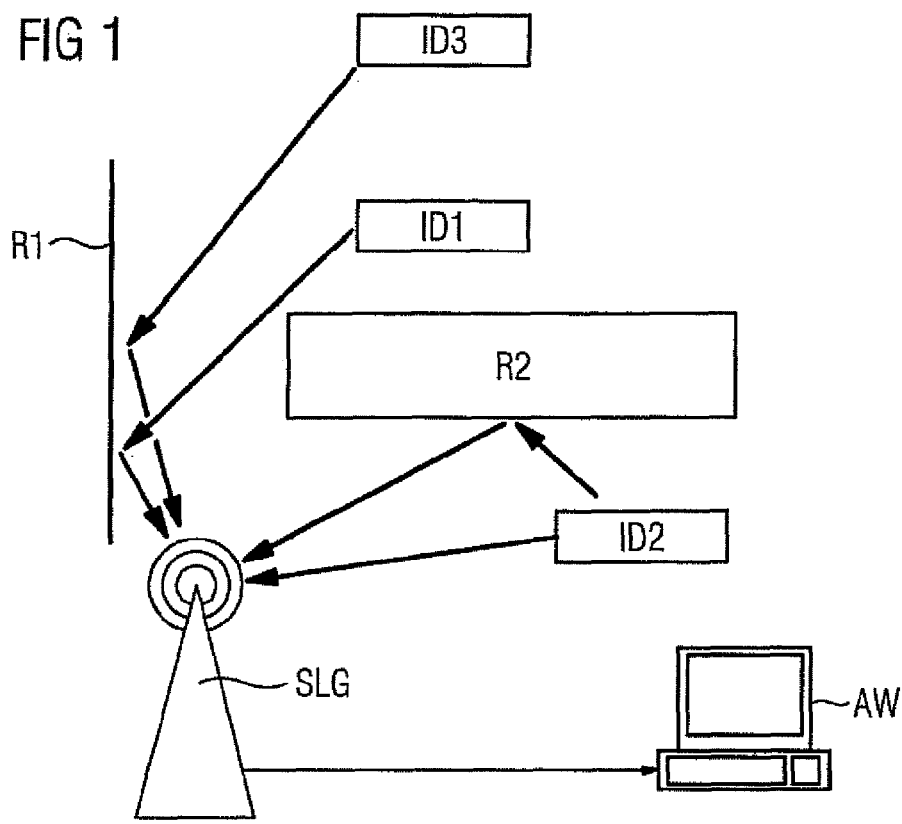
FIG. 1 shows schematically an arrangement with a read/write device with three data media and two objects with reflecting properties and with an application.
FIG. 2 shows a table listing the receive parameters (here: relative received field strength value) recorded for the individual data media (transponders) and the antenna polarizations used therein.
Figure 3:
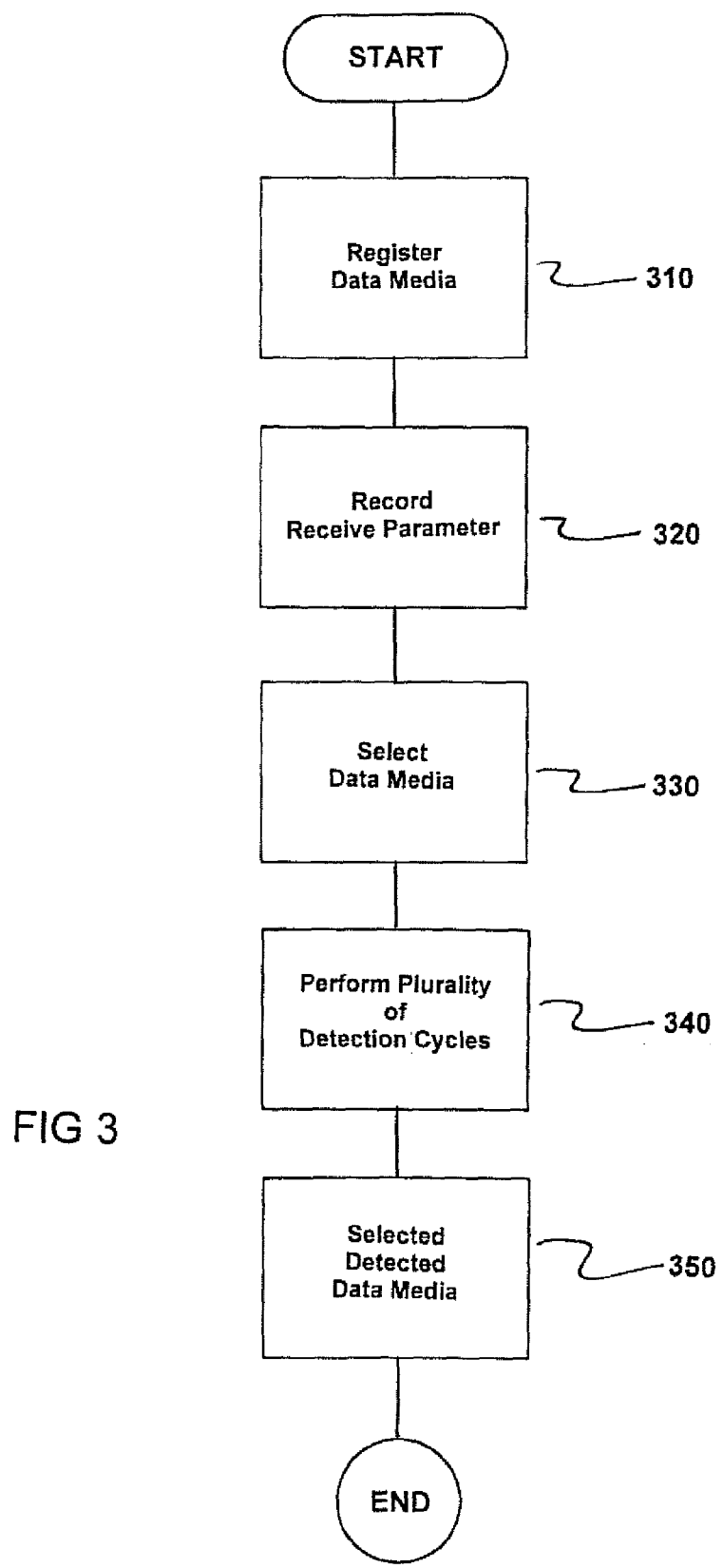
FIG. 3 shows a flowchart in accordance with the invention.

FIG. 1 shows schematically a read/write device SLG that is provided with a built-in antenna, where the antenna is switchable with respect to its radiation behavior between horizontal, vertical, right-circular and left-circular polarization. The read/write device SLG has a communication link to an application AW that executes on a personal computer and is intended to perform an automated function or the like in relation to the spatially closest data medium ID2. The data media ID1, ID2, ID3 are arranged in a spatial reception field of the read/write device SLG, where the arrows visible in the representation shown in FIG. 1 symbolize an example of the path of the electromagnetic waves (radio signals) that are transmitted in a detection or data transmission from the data media ID1, ID2, ID3 to the read/write device SLG or its antenna. The reflectors R1, R2 are machine parts, machine housings or other conductive objects that are capable of reflecting electromagnetic waves on their surface; the representation shown here is a qualitative schematic abstraction, where much more complex propagation patterns and spatial configurations may occur in a real arrangement.

It is assumed below that the data medium ID2 is the spatially closest data medium in relation to the read/write device SLG, but where the data media ID1, ID3 may generate entirely higher received field strengths in their detection according to the set antenna polarization and depending on other factors.

Although the read/write device SLG shown schematically here has a built-in switchable antenna, an external antenna that is controlled by the read/write device SLG in terms of its polarization and in terms of its radiation behavior may also be provided in an alternative embodiment. Moreover, it is assumed below by way of example that the read/write device itself performs the selection in accordance with the invention. However, in an alternative embodiment, the selection and therefore the statistical evaluation of receive parameters required for this purpose may also be performed by an external instance, such as by the application AW. Here, the evaluation device that is then provided there (usually in the form of a software model) is to be allocated functionally and within the meaning of the disclosed embodiments of the invention to the read/write device SLG.

It is now assumed, by way of example, that the read/write device SLG performs four detection cycles for the "inventory" of the data media population (data media ID1, ID2, ID3), and in fact a single detection cycle for each available antenna polarization plane H, V, CR, CL (horizontal linear, vertical linear, right-rotating circular, left-rotating circular), where a value for the field strength (received field strength RSSI—Received Signal Strength Indication) is registered in each case as the receive parameter for each data medium ID1, ID2, ID3. The received field strength is normally a value that is indicated in a logarithmic measure (e.g., decibel-milliwatt dBm). For the example selected here, the value is indicated for reasons of clarity as a "percentage", in relation to a defined maximum value. In a real arrangement, a multiplicity of cycles would be performed in real time instead of a single detection cycle per polarization plane, where the corresponding receive parameters would each be processed to yield a single result, such as through averaging, weighted averaging, or exclusion of extreme values ("outliers").

In FIG. 2, the data recorded for the detection cycles described are shown in tabular form, where this table is sorted according to data media ID1, ID2, ID3. For practical purposes, however, the actual measurements are performed separately according to polarization planes H, V, CR, CL, which means that the receive parameters (here: received field strengths) of the three data media ID1, ID2, ID3 are initially detected in at least one detection cycle with a first polarization plane (for example, H—linear horizontal), and thereafter in turn, in at least one further detection cycle with a second polarization plane (for example, V—linear vertical) three receive parameters, etc.

The values for the field strength at which the field strength has exceeded a predefined quality threshold value (here: 50%) are marked with an asterisk in the table in FIG. 2. In another embodiment, the field strength values, or only the field strength values, at which a detection of the respective data medium ID1, ID2, ID3 was successful could also be highlighted. Here, the table would have only one entry for the data medium ID1, four entries for the data medium ID2, and only two entries for the data medium ID3.

The "raw data" shown in FIG. 2 are now statistically evaluated. In a simple embodiment, focusing only on the detectability (receivability) of the respective data medium ID1, ID2, ID3, this would mean that the data medium ID1 was receivable only in one polarization plane (i.e., linear vertical), the data medium ID2 in all four polarization planes used, and the data medium ID3 in two polarization planes. In an evaluation on such a basis, the data medium ID2 would be selected as the closest data medium, and whereas the data medium ID1 would be filtered out as most probably more distant, whereas the data medium ID3 would be regarded as presumably distant or "indifferent" according to the evaluation strategy.

In an alternative evaluation strategy, the variance of the field strength values, for example, can be considered, where the variance for the data medium ID1 consists in the difference between 92% (highest value) and 26% (lowest value), i.e., is 66 percentage points. The variance for the data medium ID2, on the other hand, is only 8 percentage points, while the variance for the data medium ID3 is 65 percentage points. In this evaluation scenario, the data medium ID2 therefore has the lowest variance and would thus be selected as the closest data medium.

In practice, other statistical evaluation methods can also be used and moreover further variations of transmit parameters can also be included, i.e., along with the antenna polarization described, the transmission power, for example, the transmission frequency or other parameters can also be varied.

Using a switchable antenna polarization, the data media ID1, ID2, ID3 in the vicinity of the read/write device SLG are therefore "read" (detected) in each case with one of the possible polarization planes (H, V, CR, CL), where it is assumed that the required data medium or media ID1, ID2, ID3 is/are detected not only by means of a reflected signal (reflector R1, R2), but also directly, so that they can be well read with virtually every antenna configuration. Overshoots are often produced by reflections, but the reflection structure or degree of reflection changes significantly in each case due to the switchover of the polarization planes. As a result, different overshoots and therefore, e.g., different received field strengths can be expected according to the configuration of the antenna (polarization planes). The required transponder(s) (data medium/media) can then be statistically determined based on the "reading frequency" or based on the measured received field strengths.

Due, in particular, to different signal attenuations of the antenna configuration according to the selected polarization plane, a different transmission power may be required to detect the data media according to the selected polarization plane; a variation in the transmission power, for example according to the "power-ramping" principle, may therefore be appropriate. Whereas the antennas that are switchable in terms of the polarization plane are used in the prior art to detect as many data media of a population as possible, the use of different polarization planes in the context of the disclosed embodiments of the present invention brings about an improvement in the selection of individual transponders (data media). In particular, the problem of overshoots in industrial applications is hereby solved.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. it is the intention, therefore, to be limited only as indicated by the scope of the claims appended hereto.

What is claimed is:

1. A method for selecting at least one data medium from a number of detected wireless data media, comprising:
    registering the data media in a detection area of a read/write device via a number of detection cycles;
    recording at least one receive parameter for each of the detected wireless data media;
    selecting at least one of the closest detected data media in each case based on a statistical evaluation of the receive parameters recorded in different antenna polarizations, said statistical evaluation providing an indication of whether the at least one selected closest detected data media has been primarily directly detected or primarily indirectly detected, an indirectly detected data media not being selected;
    performing a plurality of detection cycles by the read/write device in each case with a different antenna polarization, at least one receive parameter being recorded in each case during each of the plurality of detection cycles with a respectively utilized antenna polarization for the detected data media; and
    selecting at least one of the detected data media in each case based on a statistical evaluation of the receive parameters recorded in different antenna polarizations.

2. The method as claimed in patent claim 1, wherein at least one data medium which is detectable with a highest number of different antenna polarizations is selected.

3. The method as claimed in claim 1, wherein a plurality of detection cycles are performed with each utilized antenna polarization, in each case with a different transmission power of the read/write device comprising a transmission power increasing constantly from cycle to cycle;
    wherein the transmission power which was required at least for a successful detection of a respective data medium in the respectively utilized antenna polarization is detected as the receive parameter for each detected data medium and for each antenna polarization.

4. The method as claimed in claim 2, wherein a plurality of detection cycles are performed with each utilized antenna polarization, in each case with a different transmission power of the read/write device comprising a transmission power increasing constantly from cycle to cycle;
    wherein the transmission power which was required at least for a successful detection of a respective data medium in the respectively utilized antenna polarization is detected as the receive parameter for each detected data medium and for each antenna polarization.

5. The method as claimed in claim 1, wherein the method is performed repeatedly utilizing different radio channels;
    wherein the detectability of the data media with at least one of (i) a highest possible number of different radio channels and (ii) the transmission power required at least for a successful detection in cases of a respective radio channel, and the antenna polarization used therein being used as an alternative or additional criterion for the selection or non-selection of the respective data medium.

6. A read/write device for selecting at least one data medium from a number of data media located within a detection area of the read/write device, comprising:
    an antenna built-in or connected to the read/write device, the antenna is configured to alternately operate with different antenna polarizations; and
    an evaluation unit for selecting at least one of the detected data media;
    wherein the read/write device is configured to initially perform a plurality of detection cycles, in each case with a different antenna polarization, at least one receive parameter being recorded in each case during each of the plurality of detection cycles with a respectively utilized antenna polarization for the detected data media; and
    wherein the evaluation unit is configured to perform a statistical evaluation of the receive parameters recorded in the different antenna polarizations and to select at least one of the closest detected data media subsequent to the initially performed plurality of detection cycles, said statistical evaluation providing an indication of whether the at least one selected closest detected data media has been primarily directly detected or primarily indirectly detected, an indirectly detected data media not being selected.

7. The read/write device as claimed in patent claim 6, wherein the evaluation unit is configured such that at least one data medium detectable with a highest number of different antenna polarizations is selected.

8. The read/write device as claimed in claim 6, wherein the read/write device performs a plurality of detection cycles in each case with a different transmission power of the read/write device with each antenna polarization, the different transmission power comprising a transmission power increasing constantly from cycle to cycle; and wherein the transmission power which was required at least for a successful detection of a respective data medium in a respectively utilized antenna polarization is detected as the receive parameter for each detected data medium and for each antenna polarization.

9. The read/write device as claimed in claim 7, wherein the read/write device performs a plurality of detection cycles in each case with a different transmission power of the read/write device with each antenna polarization, the different transmission power comprising a transmission power increasing constantly from cycle to cycle; and wherein the transmission power which was required at least for a successful detection of a respective data medium in a respectively utilized antenna polarization is detected as the receive parameter for each detected data medium and for each antenna polarization.

10. The read/write device as claimed in claim 6, wherein read/write device operates repeatedly using different radio channels; wherein the detectability of the data media with at least one of (i) the highest possible number of different radio channels and (ii) the transmission power required at least for a successful detection in cases in which the respective radio channel and the antenna polarization utilized therein is utilized as an alternative or additional receive parameter comprising a criterion for the selection or non-selection of the respective data medium.

11. The read/write device as claimed in claim 7, wherein read/write device operates repeatedly using different radio channels; wherein the detectability of the data media with at least one of (i) the highest possible number of different radio channels and (ii) the transmission power required at least for a successful detection in cases in which the respective radio channel and the antenna polarization utilized therein is utilized as an alternative or additional receive parameter comprising a criterion for the selection or non-selection of the respective data medium.

12. The read/write device as claimed in claim 8, wherein read/write device operates repeatedly using different radio channels; wherein the detectability of the data media with at least one of (i) the highest possible number of different radio channels and (ii) the transmission power required at least for a successful detection in cases in which the respective radio channel and the antenna polarization utilized therein is utilized as an alternative or additional receive parameter comprising a criterion for the selection or non-selection of the respective data medium.

13. The method as claimed in claim 1, wherein the wireless data media comprises RFID transponders.

14. The read/write device as claimed in claim 6, wherein the wireless data media comprises RFID transponders.

\* \* \* \* \*